(12) United States Patent
Zaid et al.

(10) Patent No.: US 7,723,273 B1
(45) Date of Patent: May 25, 2010

(54) MODIFIED EPOXY-AMINE COMPOSITIONS FOR OIL FIELD USES

(75) Inventors: Gene H. Zaid, Sterling, KS (US); Beth Ann Wolf, Hutchinson, KS (US)

(73) Assignee: JaCam Chemical Company, Inc., Sterling, KS (US)

( * ) Notice: Subject to any disclaimer, the term of this patent is extended or adjusted under 35 U.S.C. 154(b) by 0 days.

(21) Appl. No.: 12/646,749

(22) Filed: Dec. 23, 2009

Related U.S. Application Data

(63) Continuation-in-part of application No. 12/607,629, filed on Oct. 28, 2009, now abandoned.

(51) Int. Cl.
*C09K 8/42* (2006.01)
*E21B 33/14* (2006.01)

(52) U.S. Cl. .................. 507/219; 166/285; 166/292; 166/295; 166/300; 166/305.1; 507/239; 507/248

(58) Field of Classification Search ............ 507/219, 507/239, 248; 166/285, 292, 295, 300, 305.1
See application file for complete search history.

(56) References Cited

U.S. PATENT DOCUMENTS

| | | | |
|---|---|---|---|
| 3,697,462 A | 10/1972 | Hoff | |
| 3,776,796 A * | 12/1973 | Lipscomb et al. .......... | 156/181 |
| 4,022,946 A | 5/1977 | Cummings | |
| 4,526,813 A | 7/1985 | Wu | |
| 4,608,191 A | 8/1986 | Wu | |
| 4,618,658 A | 10/1986 | Hefner et al. | |
| 4,921,047 A | 5/1990 | Summers et al. | |
| 4,966,790 A | 10/1990 | Iizuka et al. | |
| 4,972,906 A | 11/1990 | McDaniel | |
| 5,045,359 A | 9/1991 | Wu | |
| 5,079,041 A | 1/1992 | Wu | |
| 5,081,168 A | 1/1992 | Edwards et al. | |
| 5,104,691 A | 4/1992 | Edwards et al. | |
| 5,232,741 A | 8/1993 | Wu | |
| 5,232,961 A | 8/1993 | Murphey et al. | |
| 5,344,674 A | 9/1994 | Wu | |
| 5,505,877 A * | 4/1996 | Krivohlavek ............... | 516/40 |
| 5,559,086 A | 9/1996 | Dewprashad et al. | |
| 5,565,505 A | 10/1996 | Papalos et al. | |
| 5,565,506 A | 10/1996 | Papalos et al. | |
| 5,609,207 A | 3/1997 | Dewprashad et al. | |
| 5,834,539 A * | 11/1998 | Krivohlavek ............... | 524/60 |
| 5,936,059 A | 8/1999 | Zaid | |
| 6,136,894 A | 10/2000 | Stark et al. | |
| 6,240,971 B1 | 6/2001 | Monette et al. | |
| 6,494,983 B1 | 12/2002 | Graue et al. | |
| 6,581,644 B1 | 6/2003 | Monette et al. | |
| 6,645,340 B2 | 11/2003 | Gienau et al. | |
| 7,063,413 B2 | 6/2006 | Gibson et al. | |
| 7,248,136 B2 | 7/2007 | Habboosh | |
| 7,341,985 B2 | 3/2008 | Lal et al. | |
| 7,407,687 B2 | 8/2008 | Zaid et al. | |
| 7,591,320 B2 | 9/2009 | Phipps et al. | |
| 7,612,130 B2 | 11/2009 | Kim | |
| 2001/0018880 A1 | 9/2001 | Pfeil et al. | |
| 2001/0035111 A1 | 11/2001 | Gienau et al. | |
| 2005/0019510 A1 | 1/2005 | Gibson et al. | |
| 2005/0231551 A1 | 10/2005 | Gibson et al. | |
| 2006/0135709 A1 | 6/2006 | Hasegawa et al. | |
| 2007/0160755 A1 | 7/2007 | Zaid et al. | |
| 2007/0181042 A1 | 8/2007 | Masanaga et al. | |
| 2007/0187097 A1 | 8/2007 | Weaver et al. | |
| 2007/0249504 A1 | 10/2007 | Ballard | |
| 2008/0105429 A1 | 5/2008 | Phipps et al. | |

FOREIGN PATENT DOCUMENTS

| | | |
|---|---|---|
| EP | 0899416 | 3/1999 |
| GB | 2419902 | 5/2006 |
| WO | WO 2007054708 | 5/2007 |

OTHER PUBLICATIONS

Etherification reaction in epoxy-amine term systems at high temperature, Mijovic et al.; Polymer, 35(12), (1994), pp. 2683-2686 (Abstract provided, 3 pages).

Expandable Tubular: Field Example of Application in Well Construction and Remediation; Daigle, Chen L. et al.; Society of Petroleum Engineers, Inc.; presented at 2000 SPE Annual Technical Conference and Exhibition, Dallas, Texas, Oct. 1-4, 2000 (14 pages).

(Continued)

*Primary Examiner*—Timothy J. Kugel
(74) *Attorney, Agent, or Firm*—Hovey Williams LLP

(57) ABSTRACT

Compressible and resilient sealing compositions for injection into oil or gas wells are provided, which are capable of forming effective seals adjacent well casings even at elevated downhole temperatures. The compositions comprise an epoxy component present in a predominant weight percentage, including an epoxy resin and a glycidyl ether modifier, as well as additional components rendering the cured compositions both compressive and resilient. The compositions are used as a partial or complete substitute for casing cements, and can be used to good effect with expandable casing installations or for sealing casing breaks. High set-up temperature (220-300° F.) compositions preferably include an ethoxylated alkyl (C10-C20) monoamine or diamine, and alkyl pyridine quaternary ammonium components.

20 Claims, 2 Drawing Sheets

OTHER PUBLICATIONS

Material Safety Data Sheet—EPON® Resin 828; Resolution Performance Products; Dec. 15, 2000 (5 pages).

Material Safety Data Sheet—APQ 1800 Corrosion Inhibitor Intermediate; JaCam Chemicals, LLC; Jul. 28, 2004 (5 pages).

Material Safety Data Sheet—JC 2090 Intermediate; JaCam Chemicals, LLC; Jul. 28, 2004 (5 pages).

Certificate of Analysis—HELOXY Modifier 48; Hexion Specialty Chemicals, Inc., Aug. 15, 2006 (12 pages).

Product Overview: Heloxy™ Epoxy Functional Modifiers; Hexion Specialty Chemicals, Inc., 2007 (8 pages).

HydraSkin™ Solid Expandable System; Weatherford International LTD., 2008 (6 pages).

Technical Data Sheet—HELOXY Modifier 48; Hexion Specialty Chemicals, Inc.;, Rev. Feb. 4, 2009 (5 pages).

Expandable Tubular Technology; Wikipedia; en.wikipedia.ork/wiki/Expandable_tubular_technology; Sep. 23, 2009 (3 pages).

Expanding Their Reach; Brunner, Lin et al.; www.thefabricator.com Sep. 23, 2009 (3 pages).

* cited by examiner

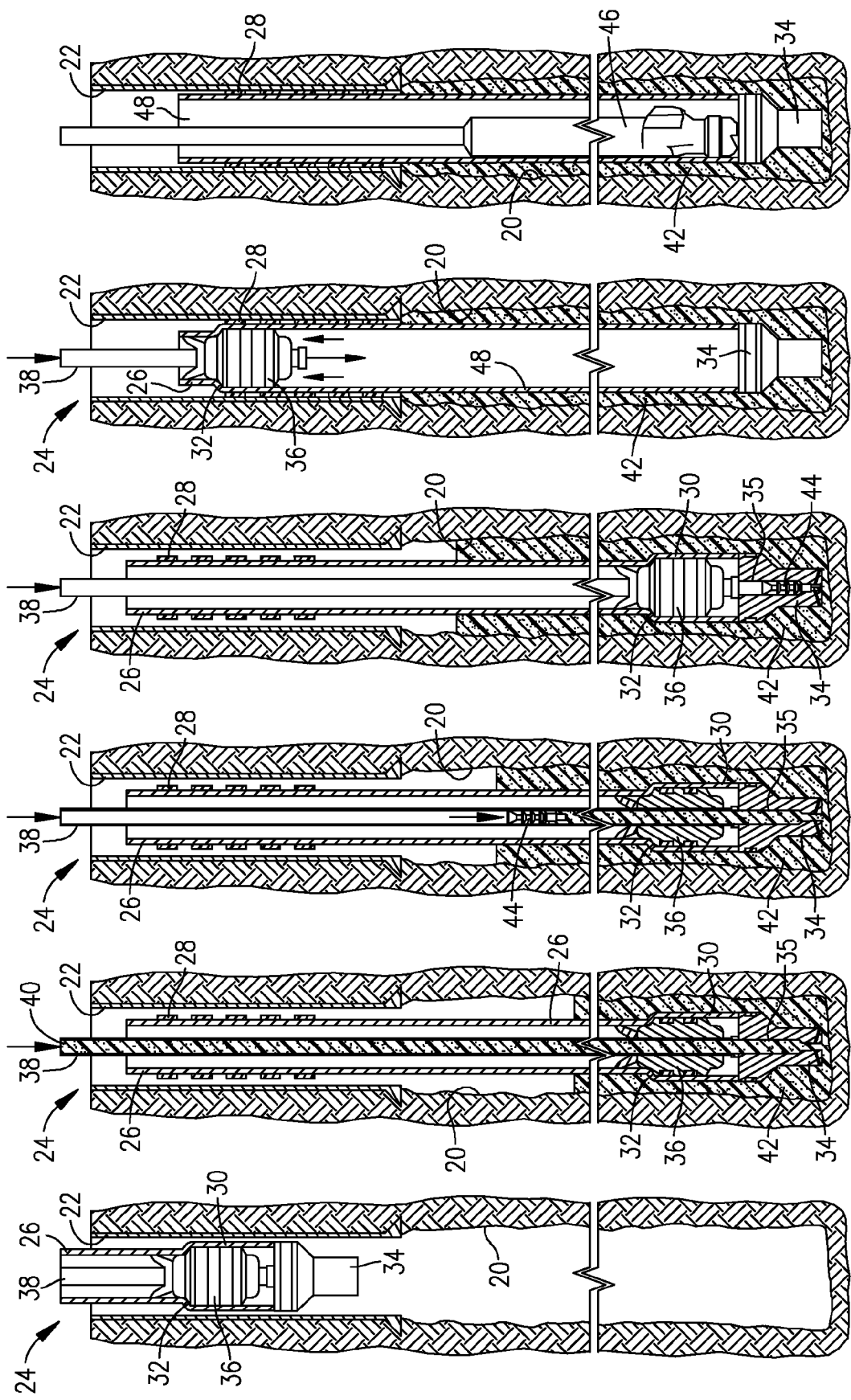

MODIFIED EPOXY-AMINE COMPOSITIONS FOR OIL FIELD USES

CROSS-REFERENCE TO RELATED APPLICATION

This is a continuation-in-part of identically titled application Ser. No. 12/607,629 filed Oct. 28, 2009 now abandoned.

BACKGROUND OF THE INVENTION

1. Field of the Invention

The present invention is broadly concerned with downhole-curable epoxy-based compositions for use in oil or gas well applications as a total or partial substitute for conventional casing cements. More particularly, the invention is concerned with such compositions and methods of use thereof, wherein the compositions include a predominant epoxy component including an epoxy resin and a glycidyl ether modifier, and one or more additional components, whereby the complete compositions may be injected into a well and cured therein at temperatures of from about 75-350° F. to create a compressible and resilient sealing body within the well.

2. Description of the Prior Art

Conventional oil and gas wells have to be drilled in multiple sections in order to ensure that the hydrostatic pressure in the section being drilled lies between the pore and fracture pressures of the surrounding formations. After drilling each section a casing is lowered into place and the annulus between casing and rock is filled with cement. Once set, the cement provides support and protection for the casing and should also provide a seal to prevent fluid communication between the formations through which the well has been drilled. However, cement often does not produce a reliable seal because it is a rigid and brittle material and because standard placement techniques do not provide a mechanism whereby it can be set into a suitable state of stress.

Conventionally, each subsequent section of the well has to be drilled at a smaller diameter in order to allow for its casing to be lowered down through the previous one, so that for very deep wells the reservoir can only be reached with a narrow diameter casing. This is a serious problem, because the smallest diameter, bottom-most casing limits the amount of hydrocarbons which can be recovered per unit time from the well.

Recently, expandable casings have been introduced into the market. These are lowered into the well and then expanded in situ to a larger diameter using a conical swaging mandrel moved from bottom to top. Using this technology the reduction in diameter with each successive section is reduced, and they can potentially be used to construct a well of constant diameter along its whole depth.

The use of solid expandable tubing in the oil and gas industry is becoming increasingly common. Such tubing offers the potential to drill deep wells of significantly larger diameter at the reservoir than can be done with conventional casings. However, expandable tubing poses new challenges for cementing. After casing expansion, the annulus between the casing and the borehole can be very narrow, which makes it difficult to achieve satisfactory mud displacement if cement is pumped at this stage. Therefore the cement is normally placed prior to the casing expansion. Accordingly, the expansion must be carried out after placement but before the cement has set; otherwise the rigid set cement will either be crushed by the expansion (potentially fracturing the surrounding rock) or will prevent expansion altogether. The cement must therefore have an unusually long thickening time, in as much as extra time must be allowed to carry out the expansion.

It is common practice to cement only the lower portion of each section in this way; if the whole annulus is cemented then an even longer thickening time is required, and this leads to excessively long wait-on-cement times in order to operate in a safe window. However, cementing only the lower section of the casing carries risks also, since it leaves the bulk of the casing unsupported and unprotected against corrosion by formation fluids, and reduces the probability of achieving zonal isolation.

Patent publication U.S. 2008/0105429 describes a method of cementing expandable well tubing making use of a sealant composition which is injected downhole and allowed to solidify into a deformable matrix. The composition may comprise poly(propylene oxide) diglycidyl ether and amine crosslinkers.

During well production, casing breaks sometimes occur along the length of the casing string. Unless promptly remedied, such breaks can drastically lower well production. It is common practice to inject additional well cement in an effort to plug the break, but this often gives only partial results.

There is accordingly a need in the art for improved downhole sealant compositions which can be used as a partial or complete replacement for conventional casing cements and which provides a compressible and resilient seal adjacent part or all of the casing.

SUMMARY OF THE INVENTION

The present invention overcomes the problems outlined above and provides compositions for injection into oil or gas wells equipped with well casings in order to provide an improved seal around the casing which is both compressible and resilient. In general, the compositions of the invention comprise an epoxy component present at a level of from about 70-97% by weight, based upon the total weight of the composition on a solvent-free basis taken as 100% by weight. This epoxy component includes an epoxy resin (e.g., the reaction product of epichlorohydrin and bisphenol A) and a glycidyl either modifier different than the epoxy resin. Suitable additional ingredients are used in conjunction with the epoxy component such that the complete composition is operable to cure within a well upon injection thereof at an elevated downhole bore temperature of from about 75-300° F. in order to create a cured, resilient body adjacent at least a portion of the well casing. The cured body has a compressibility of at least about 20% (more preferably at least about 40%) and a resiliency of at least about 60% (more preferably at least about 80%) at the elevated downhole bore temperature.

As used herein, the compressibility of the cured compositions of the invention refers to the ability of cured bodies of the compositions of thickness T to compress under the influence of a compressive force to a smaller thickness T1, without shattering or breakage at elevated downhole bore temperatures. Similarly, the resiliency of the cured compositions of the invention refers to the ability of the compressed bodies of compressed thickness T1 to expand when the compressive force is relieved to a thickness T2 greater than thickness T1, again without shattering or breakage. For example, if a given body has a thickness T of 1 inch and is compressed to a thickness T1 of 0.6 inch, this corresponds to a compressibility of 40%. Thereafter, upon relief of the compressive force, the body may expand and assume a thickness T2 of 0.8 inch. This corresponds to a resiliency of 80%.

In practice, the compositions of the invention may be formulated for optimal characteristics at high downhole bore temperatures in the range of 220-300° F. (high set-up temperature compositions), or at lower temperatures in the range of 60-150° F. (low set-up temperature compositions). Advantageously, these compositions include different components with the epoxy component.

In the case of high set-up temperature compositions, an oxyalkylated amine component and alkyl pyridine quaternary ammonium component are employed with the epoxy component. For example, the oxyalkylated amine component may be an ethoxylated tallow diamine present at a level of from about 1.5-12% by weight (more preferably from about 2-9% by weight), whereas the quaternary ammonium component is present at a similar levels, all based upon the total weight of the composition on a solvent-free basis taken as 100% by weight.

Low temperature set-up compositions may include an oxyalkylated amine, an imidazoline, or mixtures thereof as additional component(s). The weight ratio of the epoxy component to the additional component(s) is from about 1:0.5 to 1:25, and more preferably from about 1:1 to 1:5, on a solvent-free basis. An imidazoline is normally used in this context.

The invention also includes a method of treating an oil or gas well comprising the steps of injecting a composition of the invention into the well and allowing the composition to cure therein at an elevated downhole bore temperature of from about 75-350° F. This creates a cured, resilient body of the composition adjacent at least a portion of the well casing, wherein the body has the compressibility and resiliency values described above. Normally, the composition is allowed to cure over a period of about 2-12 hours.

In downhole uses, substantial amounts of the composition of the invention are used. For example, depending upon the well size and intended utility, the compositions are injected at a level of from about 350-160,000 lbs of the composition (more usually from about 1,000-10,000 lbs) on a solvent-free basis. In order to prevent undo prereaction of the components of the composition, it is preferred that the components be mixed at the well site and used substantially immediately thereafter, within about 2 hours after the components are mixed.

BRIEF DESCRIPTION OF THE DRAWINGS

FIG. 1 is a fragmentary vertical sectional view of the initial stage of installation of an expandable casing section, depicting the lower end of the casing section equipped with a shoe and a shiftable mandrel above the shoe;

FIG. 2 is a view similar to that of FIG. 1, but illustrating the next step in the installation, with the shoe and mandrel lowered to the bottom of the well bore and with the compressible and resilient material injected into the well bore around the lower end of the casing section;

FIG. 3 is a view similar to that of FIG. 2, but illustrating the final stage of injection of the compressible and resilient material;

FIG. 4 is a view similar to that of FIG. 3, but illustrating attachment of a conduit to the mandrel;

FIG. 5 is a view similar to that of FIG. 4, and illustrating upward shifting movement of the mandrel so as to radially expand the casing section;

FIG. 6 is a view similar to that of FIG. 5, and depicting the final step in the casing installation where the shoe is drilled out;

DETAILED DESCRIPTION OF THE PREFERRED EMBODIMENT

Figure 10:
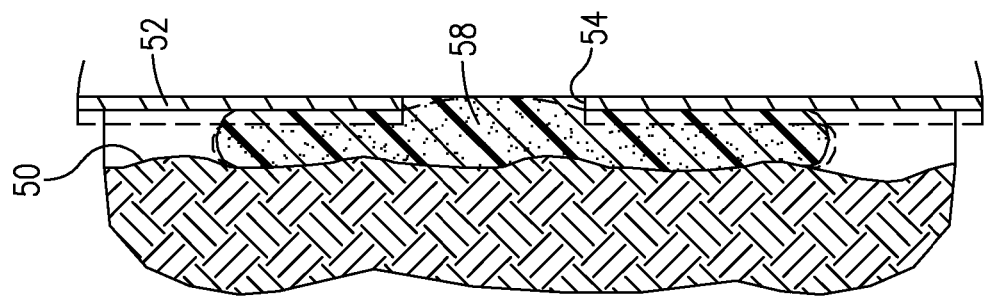
FIG. 10 is an enlarged, fragmentary view depicting the final seal of the casing break, and further illustrating the resilient nature of the seal.

As noted previously, the resilient epoxy-based compositions of the invention comprise combinations of different ingredients. For ease of discussion, these are referred to as components A, B, C, and D, and each is described separately below. In general, the aim of the invention is to provide compressible and resilient materials to be used in downhole applications in oil or gas wells as a complete or partial substitute for conventional well cements. The new materials have the property of providing excellent seals while being malleable and flexible at elevated downhole temperatures without breakage. Accordingly, the materials may be used in conjunction with expandable casings or in casing repair situations.

Component A

This component is a modified epoxy formulation containing an epoxy resin and a modifier. The epoxy fraction may be one or more of a variety of epoxies. Generally, any epoxy resin having, on the average, more than one vicinal epoxy group per molecule can be used in the composition and process of the invention. The epoxy resin may be saturated or unsaturated, aliphatic, cycloaliphatic, aromatic or heterocyclic, and may bear substituents which do not materially interfere with the curing reaction.

Suitable epoxy resins include glycidyl ethers prepared by the reaction of epichlorohydrin with a compound containing a hydroxyl group (e.g., bisphenol A) carried out under alkaline reaction conditions. Other suitable epoxy resins can be prepared by the reaction of epichlorohydrin which mononuclear di- and tri-hydroxy phenolic compounds such as resorcinol and phloroglucinol, selected polynuclear polyhydroxy phenolic compounds such as bis(p-hydroxyphenyl) methane and 4,4'-dihydroxy biphenyl, or aliphatic polyols such as 1,4-butanediol and glycerol.

Epoxy resins suitable for use in the invention have molecular weights generally within the range of 50 to about 10,000, preferably about 250 to about 2000. The commercially available Epon 828 epoxy resin, a reaction product of epichlorohydrin and 2,2-bis(4-hydroxyphenyl)propane (bisphenol A) and having a molecular weight of about 400, an epoxide equivalent (ASTM D-1652) of about 185-192, is presently preferred.

Additional epoxy-containing materials suitable for use in the present invention include the epoxidized derivatives of natural oils such as the triesters of glycerol with mixed long-chain saturated and unsaturated acids which contain, e.g., 16, 18 and 20 carbon atoms. Soybean oil is a typical triglyceride which can be converted to a polyepoxide suitable for use in the instant invention.

Other polyepoxides suitable for use in the present invention are derived from esters of polycarboxylic acids such as maleic acid, terephthalic acid, oxalic acid, succinic acid, azelaic acid, malonic acid, tartaric acid, adipic acid and the like, with unsaturated alcohols.

In addition to the foregoing, it is contemplated that suitable polyepoxides can be derived from esters prepared from unsaturated alcohols and unsaturated carboxylic acids. Representative epoxidized esters include the following: 2,3-epoxypentyl-3,4-epoxybutyrate; 2,3-epoxybutyl-3,4-epoxyhexanoate; 3,4-epoxyoctyl-2,3-epoxycyclohexane carboxylate; 2,3-epoxydodecyl-4,5-epoxyoctanoate; 2,3-epoxyisobutyl-4,5-epoxydodecanoate; 2,3-epoxycyclododedcyl-3,4-epoxypentanoate; 3,4-epoxyoctyl-2,3-epoxycyclododecane carboxylate and the like.

Other unsaturated materials which can be epoxidized to give resins suitable for use include butadiene based polymers such as butadiene-styrene copolymers, polyesters available as derivatives of polyols such as ethylene glycol with unsaturated acid anhydrides such as maleic anhydride and esters of unsaturated polycarboxylic acids. Representative polyepoxides derived from the latter include the following: dimethyl 3,4,7,8-diepoxydecanedioate; dibutyl 3,4,5,6-diepoxycyclohexane-1,2-carboxylate; dioctyl 3,4,7,8-diepoxyhexadecanedioate; diethyl 5,6,9,10-diepoxytetradecanedioate and the like.

Dimers of dienes such as 4-vinyl cyclohexene-1 from butadiene and dicyclopentadiene from cyclopentadiene can be converted to epoxidized derivatives which are suitable for use.

The modifier is preferably a glycidyl ether, and especially a triglycidyl ether, which is different than the epoxy resin. Preferred ethers are the aliphatic triglycidyl ethers, where the aliphatic group is on average a C1-C6 group. The single most preferred modifier is a commercial product, HELOXY 48, commercialized by Hexion Specialty Chemicals, Inc. of Houston, Tex. This product is specifically 1,3-propanediol, 2-ethyl-2-(hydroxymethyl)-, polymer with (chloromethyl) oxirane having CAS#30499-70-8. HELOXY 48 is used to modify liquid polyfunctional epoxy resins in order to reduce viscosity with a minimal reduction in resin functionality.

The epoxy resin/modifier mixture is normally formed by direct mixing of the ingredients. The mixture should contain at least about 50% by weight epoxy resin, more preferably from about 50-95% by weight, and most preferably from about 70-80% by weight. Correspondingly, the modifier should be present at a maximum of about 50% by weight, more preferably from about 5-50% by weight, and most preferably from about 20-30% by weight. Presently, a mixture of 75% by weight of the preferred epoxy resin (Epon 828) and 25% by weight preferred modifier (HELOXY 48) is deemed most satisfactory.

Component B

This component is a curing agent for Component A and is preferably an amine, especially oxyalkylated amines and polyamines. The curing agent useful in the invention may be aliphatic, cycloaliphatic, aromatic or heterocyclic. Exemplary curing agents are the oxyalkylated polyamines, especially the oxyalkylated N-alkyl- and N-alkylenyl-substituted 1,3-diaminoalkyls and mixtures thereof having a degree of ethoxylation of from about 0.1-30 (more preferably from about 0.5-15) moles of ethylene oxide per mole of tallow diamine. Other exemplary oxyalkylated polyamines include oxyalkylated N-hexadecyl-1,3-diaminopropane, N-tetradecyl-1,3-diaminopropane, N-octadecyl-1,3-diaminopropane, N-pentadecyl-1,3-diaminopropane, N-heptadecyl-1,3-diaminopropane, N-nonadecyl-1,3-diaminopropane, and N-octadecenyl-1,3-diaminopropane. Various commercially available mixtures of ethoxylated N-alkylated and N-alkenylated diamines can be used in the invention. Advantageously, Component B is an ethoxylated alkyl monoamine or diamine having alkyl chains (straight, branched chain, or cyclo) of from about C10-C20, more preferably from about 15-18, and most preferably tallow diamine, and a degree of ethoxylation of from about 0.1-30, more preferably from about 0.5-15, and still more preferably from about 2-8. The monoamine or diamine moiety may be an alkyl (e.g., C1-C4) amine or diamine. The presently preferred polyamine is a commercial product (Varonic T-403), ethoxylated tallow-1,3-propylene diamine, where the degree of ethoxylation is approximately 3 moles ethylene oxide per mole of tallow diamine.

Component C

This component serves as a curing agent and an aid in rendering the final compositions homogeneous. The component is preferably an alkyl pyridine quaternary ammonium compound, such as the APQ 1800 material manufactured and sold by Jacam Chemical Co. of Sterling, Kans. Generally, the acceptable quaternary ammonium compounds are of the following Formula I, where X is a halide, $R_1$ is a C10-C18 alkyl group, and $R_2$ is a C1-C4 alkyl group; in both instances, the alkyl group may be straight or branched chain.

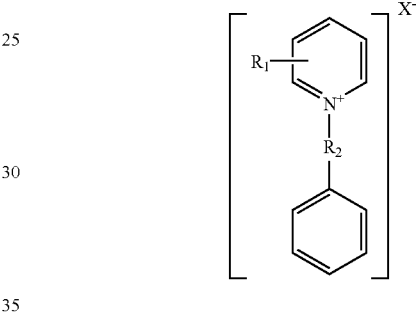

In preferred forms, X is Cl and $R_2$ is —CH2-. The quaternary ammonium component is preferably mixed or suspended in a compatible solvent, such as xylene, heavy aromatics, or alcohol solvents, such as a C1-C4 alcohol, at a level of from about 10-90% quaternary ammonium and from about 90-10% of solvent, both on a volume basis. More preferably, the component contains from about 60-80% quaternary ammonium and from about 20-40% solvent. Most preferably, Component C is 70% by volume APQ 1800 and 30% by volume isopropyl alcohol.

Component D

Component D may be an imidazoline derivative generally represented in the following structural Formula II:

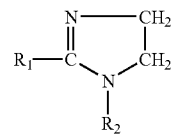

wherein $R_1$ is hydrogen or an alkyl group having up to 18 carbon atoms therein, and $R_2$ is hydrogen, or an alkyl or amine group having up to 18 carbon atoms therein. A suitable imidazoline may be prepared as a reaction product of diethylene triamine and tall oil fatty acid.

The single most preferred material is the imidazoline manufactured and sold by Jacam Chemical Co. of Sterling, Kans., under the designation JC 2090.

Preferred High Set-Up Temperature Compositions

In one aspect of the invention, compositions are provided which set up and cure at relatively high temperatures on the order of 220-300° F. Such compositions include Components A, B, and C, where Components A and B are used neat, and Component C is a quaternary ammonium mixed or suspended in a compatible solvent. If desired, the overall A, B, and C composition could have additional solvent (e.g., xylene, heavy aromatics or alcohol), although the total solvent present should be no more than a maximum of about 25% by weight, more preferably up to about 10% by weight, based upon the total weight of the composition taken as 100% by weight.

In terms of relative amounts, Component A is the predominant component and is present at a level of from about 70-97% by weight, more preferably from about 78-92% by weight, and most preferably from about 84-89% by weight. Component B is used at a level of from about 1.5-12% by weight, more preferably from about 2-9% by weight, and most preferably from about 4-8% by weight. Component C is used at a level of from about 1.5-12% by weight, more preferably from about 2-9% by weight, and most preferably from about 4-8% by weight. All of the foregoing weights are on a solvent-free basis, with the total weight of the A, B, and C composition taken as 100% by weight. The single most preferred composition is made up of about 87.6% Component A, 6.35% Component B, and 6.05% by weight Component C, where the latter includes the solvent.

In preparative procedures, Components A, B, and C can be mixed in any order until substantially homogeneous; this normally requires 15-30 minutes mixing time. If the mixing is done under ambient conditions, moderate heating (100-150° F.) may be required at cold temperatures. However, at moderate ambient temperatures, no such warming is required.

These high set-up temperature compositions are designed to cure at elevated downhole temperature over a period of from about 2-12 hours, more preferably from about 5-7 hours. The exact cure time of course depends upon the actual temperature conditions. Also, the cure time can be adjusted by changing the makeup of the composition, by varying the respective quantities of ingredients. For example, if a somewhat lower set-up temperature is required, greater amounts of Component B can be used.

Preferred Low Set-Up Temperature Compositions

These compositions are preferably made up of Component A and either Component B, Component D, or mixtures of Components B and D. The components are preferably mixed neat at a weight ratio of 1:0.5 to 1:25 of Components A to B and/or D. The more preferred weight ratio is from about 1:1 to 1:5. In preferred forms, this composition is made up of a 1:1 weight ratio of the preferred Component A and the JC 2090 imidazoline. All of the above weight ratios are on a solvent-free basis. As before, these components are mixed in any order until substantial homogeneity is achieved. Although not deemed optimum, the compositions can also have a solvent fraction of the type and in the amounts set forth above with respect to the high set-up temperature compositions.

The low set-up temperature compositions are designed to cure at temperatures of from about 60-150° F., more preferably from about 75-130° F., over a period of 2-12 hours, more preferably from about 5-7 hours.

Preparation and Use of the High and Low Set-Up Temperature Compositions

Both the high and low set-up temperature compositions are used in the same manner. That is, the compositions are prepared by mixing of the respective components, usually at the well site, and are injected substantially immediately after mixing (e.g., within two hours, and preferably within one hour) into the well fluid in relatively high quantities. That is, a given treatment may involve injection of from about 350-160,000 lbs of composition, depending upon the size of the well and the intended utility. Generally, the downhole compositions of the invention are used in a one-time application at a level of from about 1,000-10,000 pounds, more preferably from about 500-5,000 pounds, based upon the volume of the well casing as well as the size of any casing leaks. All of the foregoing pound ranges are on a solvent-free basis. This is to be contrasted with the very minor amounts of materials used in the corrosion inhibition compositions described in U.S. Pat. No. 5,945,164. The '164 patent teaches that the compositions thereof are used at low levels which typically equate to 2-3 gallons used weekly or monthly.

In order to assure rapid migration of the compositions to downhole locations, the well fluid after composition injection may be pressurized by the application of nitrogen or air under pressure. When the compositions reach the desired downhole location, they begin to set up and cure around the base of the casing or at the area of a casing break, in order to form a cured body of material. This set-up yields an effective sealing body of appropriate thickness and mass. When fully cured, the compositions of the invention exhibit a high degree of compressibility and resilience, even at high downhole temperatures. For example, at 250° F. ambient, the preferred high set-up temperature compositions will compress as much as 20%, more preferably as much as 40%, e.g., preferably from about 20%-40% compression. Moreover, the cured compositions are resilient, i.e., in the event of casing movement, the cured compositions will resiliently "give" to maintain a seal without cracking. Thus, if a high set-up temperature composition having a thickness of about 1 inch undergoes a 40% compression, the compressed body will have a thickness of about 0.6 inch. This compressed body also has a high degree of resiliency, i.e., the body will return to a thickness of at least about 60%, and more preferably at least about 80%, of the original pre-compression thickness when the body is no longer compressed. In the above example, where the compressed body had a thickness of 0.6 inch, the body returned to a thickness of about 0.8 inches when no longer compressed. These same compression/resiliency levels described with reference to the high set-up temperature compositions are also found with the low set-up compositions hereof.

The compositions of the invention can be used in a variety of ways, such as normal well cementing, casing repairs, or during the installation of expandable casings. By way of example, FIGS. 1-6 illustrate the use of the compositions of the invention during expandable casing installation, whereas FIGS. 7-10 illustrate a casing repair situation.

Turning first to FIGS. 1-6, a well bore 20 is depicted having a conventional casing section 22 and the open bore below this section. In the first step (FIG. 1), the lower end of an expandable casing assembly 24 is dropped through casing section 22. The assembly 24 includes a smaller diameter upper casing portion 26 equipped with annular, external pads 28. The assembly 24 also has a lowermost, radially expanded section 30 integral with section 22. An annular shoulder 32 extends between the sections 26 and 30. A shoe 34 is secured to the lower end of section 30 as shown, and has a central material flow passageway 35. A shiftable forming mandrel 36 is seated within casing section 30 and mates with shoulder 32. A tubular conduit 38 is operably coupled with mandrel 36 and communicates with the passageway 35 of shoe 34.

In the next installation step, the assembly 24 is shifted downwardly until the lower end of shoe 34 is adjacent the bottom of the well bore. At this point, the compressible and resilient composition 40 of the invention is injected through conduit 38 (FIG. 2) such that the material forms an annular body 42 about the shoe 34, casing section 30, shoulder 32, and a portion of the casing section 26. FIGS. 3 and 4 illustrate the final application of the composition 40 by means of a drop dart 44 inserted into conduit 38 with pressurized liquid applied above the plug for this purpose. Ultimately, the plug 44 serves to block the lower open end of passageway 35 (FIG. 4).

FIG. 5 depicts upward movement of mandrel 36, typically by means of pressurized liquid passed through conduit 38 and mandrel 36. However, the mandrel 36 may also be shifted upwardly by exerting a pulling force on conduit 38. In any case, as the mandrel 36 moves upwardly, the casing section 26 is expanded until the pads 28 come into contact with casing section 22. It will be observed that the final diameter of the casing section 26 is essentially the same as the original diameter of the casing section 30. Moreover, as the annulus between the casing section 26 and well bore 20 decreases owing to casing expansion, the annular body 42 compresses and moves upwardly along a greater extent of the length of the casing section, as can be seen from a comparison of FIGS. 4 and 5.

It is important to understand that the described casing expansion preferably occurs prior to the time that the annular body 42 is fully cured within the well. However, owing to the compressible and resilient nature of the composition 40, there is a greater operating window as compared with use of conventional casing cements. That is, the material 40 even in a partially cured state will retain sufficient flexibility to conform with the contours of the casing and well bore.

Ultimately, mandrel 36 exits the upper end of casing section 26 so that the latter assumes the configuration illustrated in FIG. 6. At this point, it is only necessary to drop a drill 46 into the expanded casing section 48 so as to drill out the shoe 34. This permits normal well drilling and recovery operations.

Figure 9:
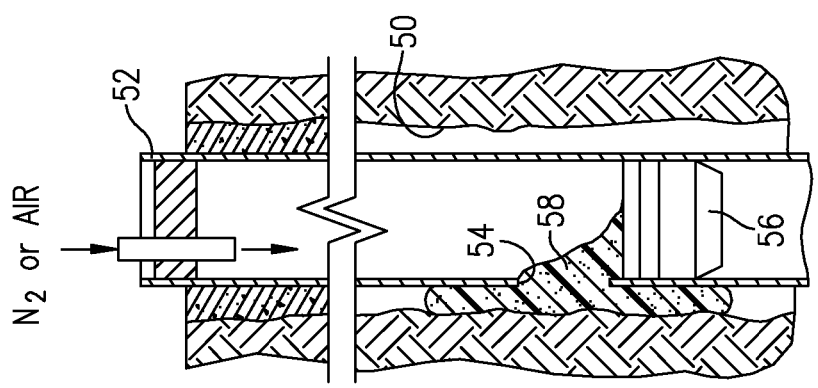
FIG. 9 is a view similar to that of FIG. 8, but illustrating an optional step wherein compressed gas is used to pressurize the well fluid and material in order to force the latter through the casing break to form a seal.
Figure 8:
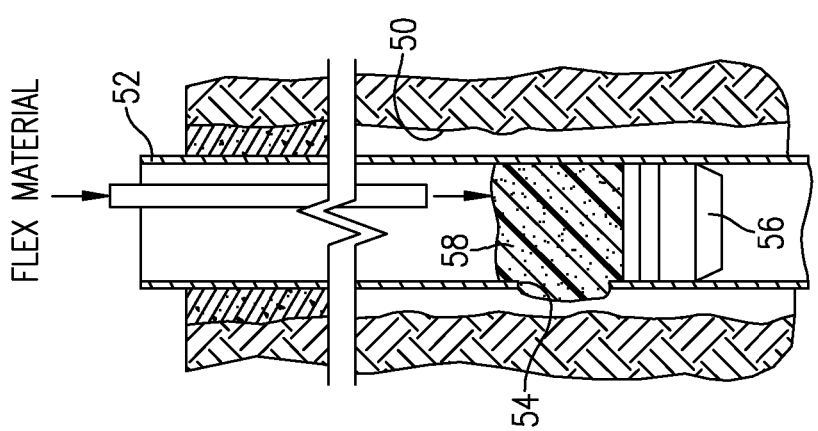
FIG. 8 is a fragmentary vertical sectional view illustrating the first step in the process for repairing the casing break, with provision of a temporary plug below the break and introduction of the compressible and resilient material of the invention.
Figure 7:
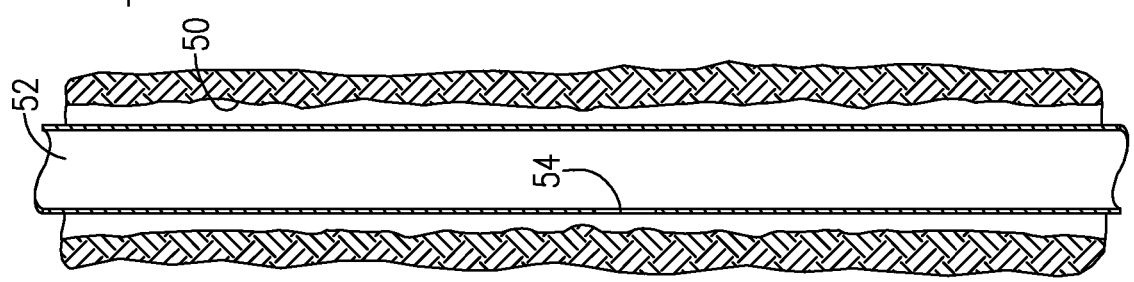
FIG. 7 is a fragmentary vertical sectional view of an in-place casing section having a casing break.

FIG. 7 illustrates a well bore 50 having a casing section 52 therein, but with a break 54 in the sidewall of the section 52. In order to repair this break, a plug 56 is lowered into casing 52 to a point below break 54. Next, the material of the invention is delivered into the casing 52, normally by injecting the material into well fluid. The material 58 of the invention will descend downwardly under the influence of gravity until plug 54 is encountered, whereupon the material will begin to flow outwardly through break 54. This process continues until a seal is formed which extends above and below the break 54 (FIG. 9). Once the material 58 cures, a compressible and resilient seal is obtained. The plug 56 can then be retrieved or drilled out of the casing 52. If desired, pressurized air or nitrogen may be injected into the well fluid above the material 58 (FIG. 9), in order to accelerate the material descent and formation of the seal.

The compressible and resilient nature of the material 58 creates an effective seal resistant to shattering or breaking typical of conventional casing cements. That is, during flexure of the casing 52 as shown in FIG. 10, the material 58 will compress and relax in order to conform with the flexure, in order to maintain the seal.

We claim:

1. A composition for injection into an oil or gas well having a well bore and a well casing within the well bore, said composition comprising an epoxy component and a curing agent, said epoxy component present at a level of from about 70-97% by weight, said epoxy component including an epoxy resin and a glycidyl ether modifier different than said epoxy resin, said curing agent comprising an ethoxylated alkyl monoamine or diamine having a C10-C20 carbon alkyl chain, and a degree of ethoxylation of from about 0.1-30 moles of ethylene oxide per mole of alkyl monoamine or diamine, said curing agent being present at a level of from about 1.5-12% by weight, said weight percentages based upon the total weight of the composition on a solvent-free basis taken as 100% by weight, said composition operable to cure within said well upon said injection thereof at an elevated downhole bore temperature of from about 75-300° F. in order to create a cured, resilient body adjacent at least a portion of the well casing, said body having a compressibility of at least about 20% and a resiliency of at least about 60% at said elevated downhole bore temperature.

2. The composition of claim 1, said composition being curable at an elevated downhole temperature of from about 220-300° F., said composition including said epoxy component, said curing agent, and an alkyl pyridine quaternary ammonium component.

3. The composition of claim 2, said epoxy resin component being the reaction product of epichlorohydrin and bisphenol A, and said modifier being an aliphatic triglycidyl ether, said ethoxylated diamine being present at a level of from about 1.5-12% by weight, and said alkyl pyridine quaternary ammonium component selected from the group consisting of compounds of Formula I and present at a level of from about 1.5-12% by weight, all of the foregoing weight percentages based upon the total weight of the composition on a solvent-free basis taken as 100% by weight; wherein Formula I is:

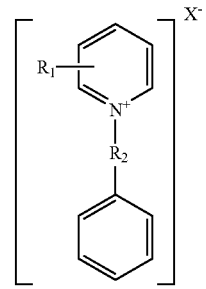

where X is a halide, $R_1$ is $C_{10}$-$C_{18}$ alkyl group and $R_2$ is $C_1$-$C_4$ alkyl group.

4. The composition of claim 3, said epoxy component being present at a level of about 84-89% by weight, said ethoxylated diamine being present at a level of from about 2-9% by weight, and said alkyl pyridine quaternary ammonium component being present at a level of from about 2-9% by weight.

5. The composition of claim 4, said composition consisting essentially of said epoxy component, an ethoxylated tallow diamine having about three moles of ethylene oxide per mole of tallow diamine, and said pyridine quaternary ammonium component.

6. The composition of claim 4, said epoxy component being present at a level of about 87.6%, said ethoxylated diamine being present at a level of about 6.35% by weight, and said alkyl pyridine quaternary ammonium compound being present at a level of from about 6.05% by weight.

7. The composition of claim 1, said composition being curable at an elevated downhole temperature of from about 60-150° F., said composition including said epoxy component, an ethoxylated alkyl diamine, and an imidazoline.

8. The composition of claim 7, said epoxy resin being the reaction product of epichlorohydrin and bisphenol A, said modifier being an aliphatic triglycidyl ether, and said imidazoline being in accordance with Formula II; wherein Formula II is:

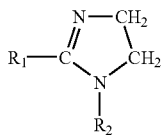

where $R_1$ is hydrogen or an alkyl group having up to 18 carbon atoms therein, and $R_2$ is hydrogen or an alkyl or amine group having up to 18 carbon atoms therein.

9. The composition of claim 1, said epoxy resin being the reaction product of epichlorohydrin and bisphenol A, and said modifier being an aliphatic triglycidyl ether.

10. The composition of claim 1, said epoxy component containing from about 50-95% by weight of said epoxy resin and from about 5-50% by weight of said modifier.

11. The composition of claim 1, said composition including at least one other component selected from the group consisting of an alkyl pyridine quaternary ammonium compound and imidazoline.

12. The composition of claim 1, said compressibility being at least about 40%, and said resiliency being at least about 80%.

13. The composition of claim 1, said composition consisting essentially of said epoxy component and said curing agent.

14. A method of treating an oil or gas well having a well bore and a well casing within the well bore, said method comprising the steps of injecting into said well the composition of claim 1, and allowing said composition to cure within said well at an elevated downhole bore temperature of from about 75-300° F. in order to create a cured, resilient body adjacent at least a portion of the well casing, said body having a compressibility of at least about 20% and a resiliency of at least about 60% at said elevated downhole bore temperature.

15. The method of claim 14, including the steps of mixing the components making up said composition at the site of said well, and substantially immediately thereafter performing said composition injection step.

16. The method of claim 15, including the step of injecting said composition within two hours after said mixing step.

17. The method of claim 14, including the step of allowing said composition to cure over a period of from about 2-12 hours.

18. The method of claim 14, said composition being injected into said well at a level of from about 350-160,000 lbs of the composition on a solvent-free basis.

19. The method of claim 14, said level being from about 1,000-10,000 lbs of the composition.

20. The method of claim 14, including the step of injecting said composition into well fluid, and pressurizing said well fluid in order to move said composition downwardly within the well.

* * * * *